United States Patent
Taniguchi (10) Patent No.: US 8,194,300 B2
(45) Date of Patent: Jun. 5, 2012

(54) OPTICAL SCANNER AND IMAGE FORMING APPARATUS

(75) Inventor: Hideo Taniguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 413 days.

(21) Appl. No.: 12/487,946

(22) Filed: Jun. 19, 2009

(65) Prior Publication Data
US 2009/0316242 A1 Dec. 24, 2009

(30) Foreign Application Priority Data
Jun. 20, 2008 (JP) ................................. 2008-161159

(51) Int. Cl.
*G02B 26/08* (2006.01)
(52) U.S. Cl. .................. 359/199.3; 359/200.7; 347/247
(58) Field of Classification Search .............. 359/199.3, 359/200.7; 347/247, 248, 250
See application file for complete search history.

(56) References Cited

U.S. PATENT DOCUMENTS

| | | | | |
|---|---|---|---|---|
| 6,765,706 B2 * | 7/2004 | Tokuda et al. | ............. | 359/220.1 |
| 7,230,637 B2 * | 6/2007 | Harris et al. | .................. | 347/237 |
| 2004/0119810 A1 * | 6/2004 | Cannon et al. | ................ | 347/233 |
| 2004/0119811 A1 * | 6/2004 | Bush et al. | .................... | 347/237 |
| 2005/0231581 A1 | 10/2005 | Nomura et al. | | |
| 2005/0259143 A1 | 11/2005 | Nomura et al. | | |
| 2009/0252512 A1 | 10/2009 | Nomura et al. | | |

FOREIGN PATENT DOCUMENTS

| | | |
|---|---|---|
| JP | 4-314019 A | 11/1992 |
| JP | 2005-292627 A | 10/2005 |
| JP | 2005-309002 A | 11/2005 |

* cited by examiner

*Primary Examiner* — Frank Font
(74) *Attorney, Agent, or Firm* — Birch, Stewart, Kolasch & Birch, LLP (57) ABSTRACT

An optical scanner includes an inductor, an electric supply unit, an emitter, a mirror, a first receiving element, a second receiving element, and a measuring unit. The electric supply unit applies a supply voltage to the inductor alternately in opposite applying directions. The mirror reflects a laser beam to scan a photosensitive body within a scanning range. Each of the receiving elements is positioned at one end of the scanning range. The measuring unit measures the scanning time taken for the laser beam to be detected by the second receiving element after the beam is detected by the first receiving element. When the mirror scans the photosensitive body along a first primary scanning line after the mirror scans the body along a second primary scanning line, the electric supply unit varies the supply voltage according to the scanning time measured for the second primary scanning line.

4 Claims, 10 Drawing Sheets

FIG.1

FIG.2A
TURNING ANGLE 0°

WHEN FLUCTUATION IS 0%

REFERENCE CLOCK FOR 1K TIME COMPARISON   100 MHz   Vcc = 21V (RATED VOLTAGE)
COUNT FOR 3 μs                            300
COUNT FOR 50 μs                          5,000

H : 3.00 μsec
I : 50.00 μsec
J : 3.00 μsec
K : 50.00 μsec

```
                  COUNTER FOR SCANNING         COUNTER DATA COMPARISON         SUPPLY VOLTAGE CONTROL
                  IN DIRECTION B
REFERENCE                                   DATA FOR H AND J ARE INVALID
CLOCK             H   300                   (COUNTS OF 500 AND LESS ARE INVALID)
BD1               I  5000
BD2                                         X = 5000 (REFERENCE COUNT)
                                                                              Vcc1 = 21−(X−K)         Vcc1 ──► DRIVE CIRCUIT
                  COUNTER FOR SCANNING       X − I = 0                               × 0.021          21V         22
                  IN DIRECTION A             X − K = 0                        Vcc2 = 21−(X−I)
BD1               J   300                    I − K = 0                               × 0.021          Vcc2 ──►
BD2               K  5000                                                                             21V
                        24
```

OPTICAL SCANNER AND IMAGE FORMING APPARATUS

CROSS REFERENCE

This Nonprovisional application claims priority under 35 U.S.C. §119(a) on Patent Application No. 2008-161159 filed in Japan on Jun. 20, 2008, the entire contents of which are hereby incorporated by reference.

BACKGROUND OF THE INVENTION

1. Field of the Invention

The present invention relates to an optical scanner for forming an electrostatic latent image on a photosensitive body by scanning the body with a laser beam. The invention also relates to an image forming apparatus fitted with such a scanner.

2. Description of the Related Art

A conventional image forming apparatus such as a laser printer is fitted with an optical scanner for forming an electrostatic latent image on a photosensitive body by scanning the body with a laser beam. This scanner includes a scanning optical system consisting mainly of a semiconductor laser as a light source, a galvanomirror, and a scanning lens.

The galvanomirror is supported rotatably on a shaft and turns on it within a specified scanning range. While the galvanomirror is turning on the shaft at a uniform angular velocity, the galvanomirror scans the photosensitive body along primary scanning lines by reflecting the laser beam emitted from the semiconductor laser. The direction in which the galvanomirror turns on the shaft changes with the polarity of the magnetic field generated by the inductor of the optical scanner.

If the galvanomirror scanned the photosensitive drum directly without a scanning lens, a difference would arise in beam-condensing timing between the middle and each end of the drum. This would make it impossible to obtain an image of uniform quality. Therefore, the optical scanner of the conventional image forming apparatus is fitted with an fθ lens or another scanning lens for so correcting the difference in beam-condensing timing that the reflected beam describes a linear locus.

The optical scanner of the conventional image forming apparatus forms an electrostatic latent image on the photosensitive body by means of both the primary scanning performed by the reflection of the laser beam from the turning galvanomirror and the secondary scanning performed by the movement of the photosensitive body. If the photosensitive body is a drum, the latent image can be recorded at a higher density by either rotating the drum at a lower speed or turning the galvanomirror at a lower angular velocity. Accordingly, this scanner makes it possible to form an image of higher pixel density by switching both the rotational speed of the photosensitive drum and the angular velocity of the galvanomirror to lower values.

JP H4-314019 A discloses an optical scanner for scanning a photosensitive body with the laser beam reflected by a galvanomirror.

The speed at which the galvanomirror scans the photosensitive body along one of the primary scanning lines may differ from the speed at which the galvanomirror scans the body along another. In many cases, a difference may arise in scanning speed between two primary scanning lines along which the photosensitive body is scanned in opposite directions. Differences in scanning speed may be due to the aged deterioration of the galvanomirror shaft. Differences in scanning speed among the primary scanning lines make differences in pixel density among the lines. This results in the formation of an electrostatic latent image of heterogeneous quality on the photosensitive body. The development of the latent image of heterogeneous quality results in the formation of a microscopically mottled image on a sheet of paper.

Thus, the optical scanner of the conventional image forming apparatus cannot form an image of uniform quality, although it can form an image of high pixel density.

An object of the present invention is to provide an optical scanner for forming an electrostatic latent image of uniform quality on a photosensitive body by scanning the body along primary scanning lines at a controlled constant speed. Another object of the invention is to provide an image forming apparatus fitted with such a scanner.

SUMMARY OF THE INVENTION

An optical scanner according to the present invention includes an inductor, an electric supply unit, an emitter, a mirror, a first receiving element, a second receiving element, and a measuring unit.

The electric supply unit applies a supply voltage to the inductor alternately in opposite applying directions so that the inductor generates a magnetic field based on the supply voltage. The emitter emits a laser beam. The mirror reflects the laser beam to scan a photosensitive body in opposite scanning directions within a scanning range while the mirror is turned by the magnetic field. Each of the receiving elements is positioned at one end of the scanning range.

The measuring unit measures the scanning time taken for the laser beam to be detected by the second receiving element after the beam is detected by the first receiving element when the mirror scans the photosensitive body in one of the scanning directions. The measuring unit also measures the scanning time taken for the laser beam to be detected by the first receiving element after the beam is detected by the second receiving element when the mirror scans the body in the other scanning direction.

When the mirror scans the photosensitive body along a first primary scanning line after the mirror scans the body along a second primary scanning line, the electric supply unit varies the supply voltage according to the scanning time measured for the second primary scanning line. The magnetic field based on the varied voltage makes the mirror scan the body along the first primary scanning line.

If the scanning time measured for the second primary scanning line is longer than a specified reference time, the electric supply unit increases the supply voltage when the mirror scans the photosensitive body along the first primary scanning line. If this measured time is shorter than the reference time, the supply unit decreases the voltage when the mirror scans the body along the first primary scanning line. This normalizes the speed at which the body is scanned along the first primary scanning line.

BRIEF DESCRIPTION OF THE DRAWINGS

FIG. 7 is a timing chart of the voltage control based on the intervals at which the photodiodes detect the laser beam when the scanning speed of the galvanomirror is normal.

DETAILED DESCRIPTION OF THE INVENTION

Image forming apparatus embodying the present invention will be described below.

Figure 1:
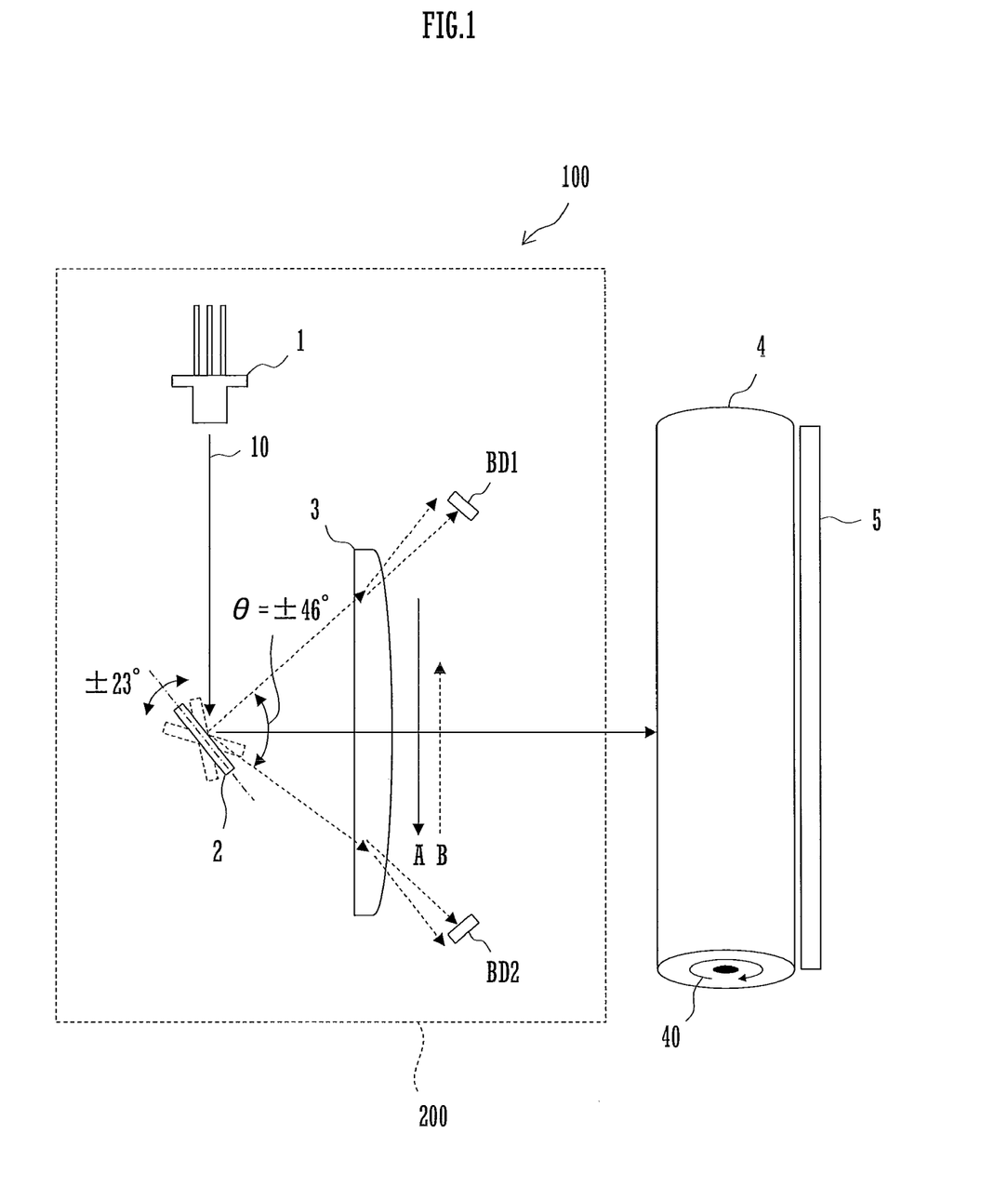
FIG. 1 schematically shows the structure of an image forming apparatus according to an embodiment of the present invention.

FIG. 1 schematically shows the structure of an image forming apparatus 100 according to an embodiment of the present invention. The apparatus 100 includes a photosensitive drum 4, a charging colotron (not shown), a laser scanner 200, a developing device 5, a pre-processing colotron (not shown), a transfer colotron (not shown), an antistatic colotron (not shown), a cleaner, and an antistatic lamp (not shown).

The photosensitive drum 4 rotates on its axis in a direction 40. The charging colotron charges the drum 4 in advance. The laser scanner 200 writes an electrostatic latent image on the charged drum 4. The developing device 5 develops the latent image on the drum 4 into a visible image with toner. The pre-processing colotron eliminates the charge on the visible toner image on the drum 4. The transfer colotron transfers the toner image on the drum 4 to a sheet of paper. After the toner image is transferred to the sheet, which is adsorbed electrostatically to the drum 4, the antistatic colotron eliminates the charge on the adsorbed sheet and releases the sheet from the drum 4. The cleaner removes the residual toner on the drum 4. The antistatic lamp eliminates the residual charge on the drum 4.

Figure 2A:
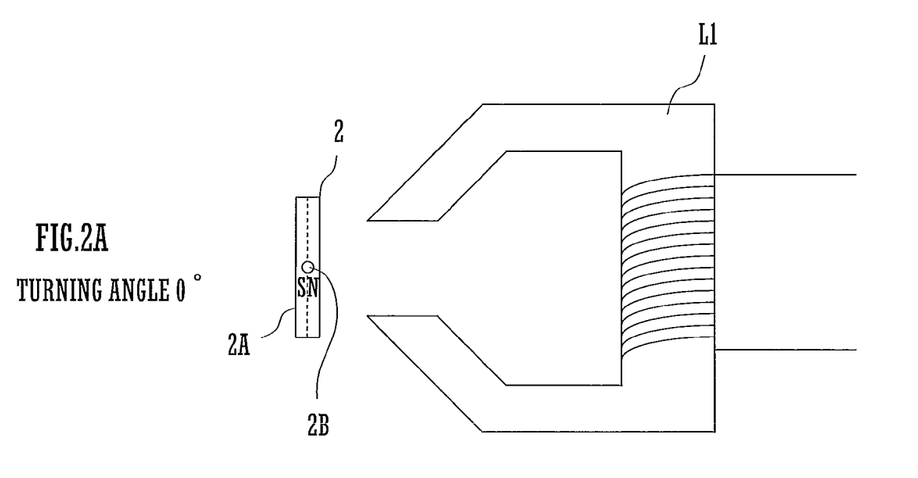
FIGS. 2A-2C show how the magnetic field generated by the inductor of the laser scanner of the image forming apparatus turns the galvanomirror of the scanner.
Figure 2B:
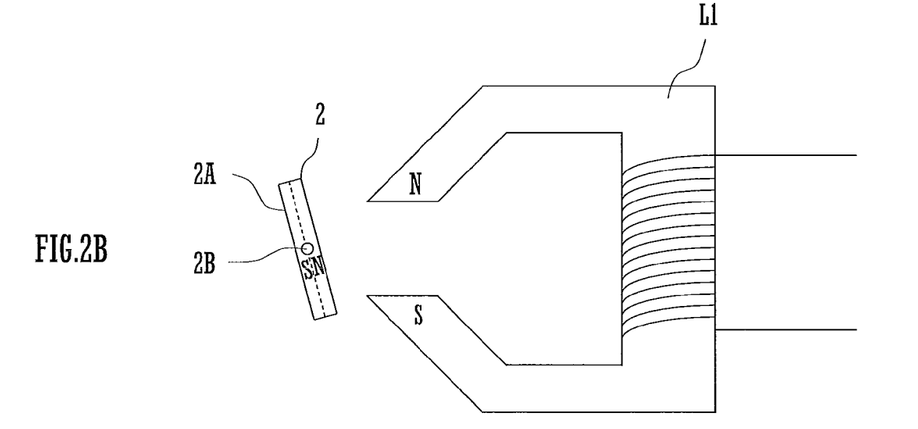
Figure 2C:
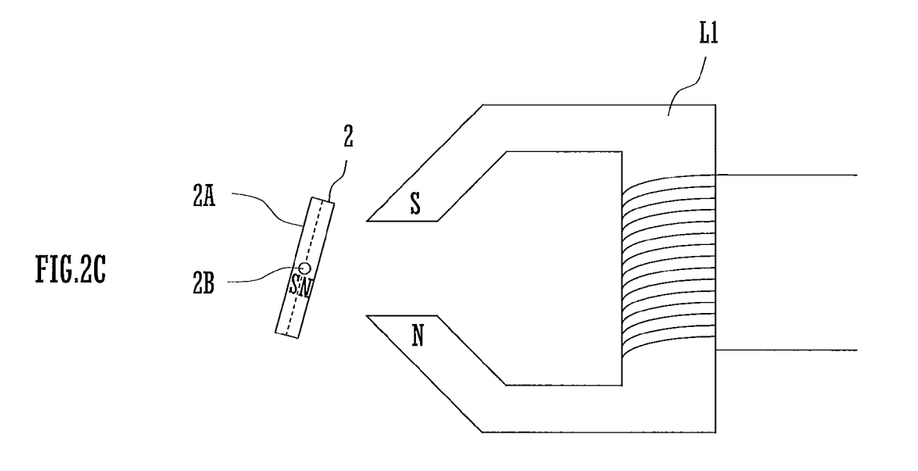

With reference to FIGS. 1 and 2A-2C, the laser scanner 200 includes a laser diode 1, a galvanomirror 2, an arcsine lens 3, a pair of photodiodes BD1 and BD2, and an inductor L1. FIGS. 2A-2C show the angular change of the galvanomirror 2, which can be turned by the magnetic field generated by the inductor L1.

The laser diode 1 emits a laser beam 10. The galvanomirror 2 is supported rotatably on a shaft 2B and turns within a specified scanning range θ. As shown in FIG. 2A, the galvanomirror 2 has magnetic poles on both its sides. The reflecting surface 2A of the galvanomirror 2 reflects the laser beam 10 while the galvanomirror is turning on the shaft 2B at a uniform angular velocity between its angular positions shown in FIGS. 2B and 2C. The direction in which the galvanomirror 2 turns on the shaft 2B changes with the polarity of the magnetic field generated by the inductor L1.

Figure 3:
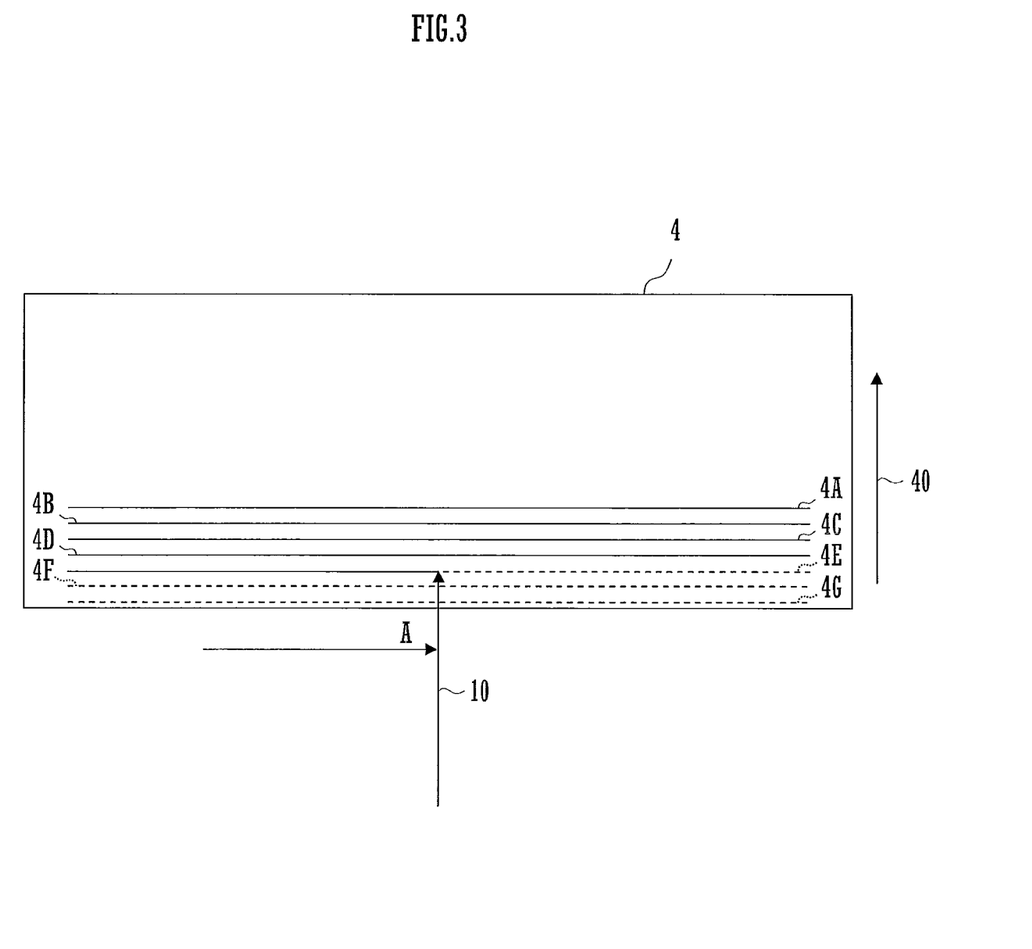
FIG. 3 shows how the photosensitive drum of the image forming apparatus is scanned with the laser beam reflected by the galvanomirror.

With reference to FIGS. 1 and 3, the galvanomirror 2 scans the photosensitive drum 4 along primary scanning lines 4A-4G, etc. alternately in opposite directions A and B with the laser beam 10 reflected by the galvanomirror surface 2A.

If the galvanomirror 2 scanned the photosensitive drum 4 directly without the arcsine lens 3, a difference would arise in beam-condensing timing between the middle and each end of the drum 4. This would make it impossible to obtain an image of uniform quality. The laser scanner 200 so corrects the difference by means of the arcsine lens 3 that the reflected beam 10 describes a linear locus.

The galvanomirror 2 scans the photosensitive drum 4 with the laser beam 10 from the laser diode 1 normally at a constant linear velocity. The beam 10 from the diode 1 is shaped by the galvanomirror 2, the arcsine lens 3, and other optical parts (not shown), which may be a collimator lens, an aperture plate, and a cylindrical lens.

With reference to FIG. 3, the laser scanner 200 forms an electrostatic latent image on the photosensitive drum 4 by scanning the drum with the laser beam 10. The developing device 5 develops the latent image on the drum 4.

The electrostatic latent image is formed by both the primary scanning performed by the reflection of the laser beam 10 from the turning galvanomirror 2 and the secondary scanning performed by the rotation of the photosensitive drum 4 in the direction 40. The electrostatic latent image can be recorded at a higher recording density by either rotating the drum 4 at a lower speed or turning the galvanomirror 2 at a lower angular velocity. This makes it possible to form an image of higher pixel density by switching both the rotational speed of the drum 4 and the angular velocity of the galvanomirror 2 to lower values.

However, the speed at which the galvanomirror 2 scans the photosensitive drum 4 along one of the primary scanning lines (for example, 4A) may differ from the speed at which the galvanomirror scans the drum along another of them (for example, 4C or 4D). In particular, the speeds at which the drum 4 is scanned along the lines 4A, 4C, 4E, 4G, etc. in the direction A may often differ from the speeds at which the drum is scanned along the lines 4B, 4D, 4F, etc. in the direction B. The differences in scanning speed may be made by the aged deterioration of the galvanomirror shaft 2B.

The differences in scanning speed among the primary scanning lines would make differences in pixel density among the lines. This would result in the formation of an electrostatic latent image of heterogeneous quality.

With reference to FIG. 1, the photodiodes BD1 and BD2 are fitted at both ends of the scanning range θ, within which the galvanomirror 2 scans the photosensitive drum 4 with the laser beam 10. The photodiodes BD1 and BD2 detect the laser beam 10 at both ends of the scanning range θ. The photodiodes BD1 and BD2 are connected as stated below.

Figure 4:
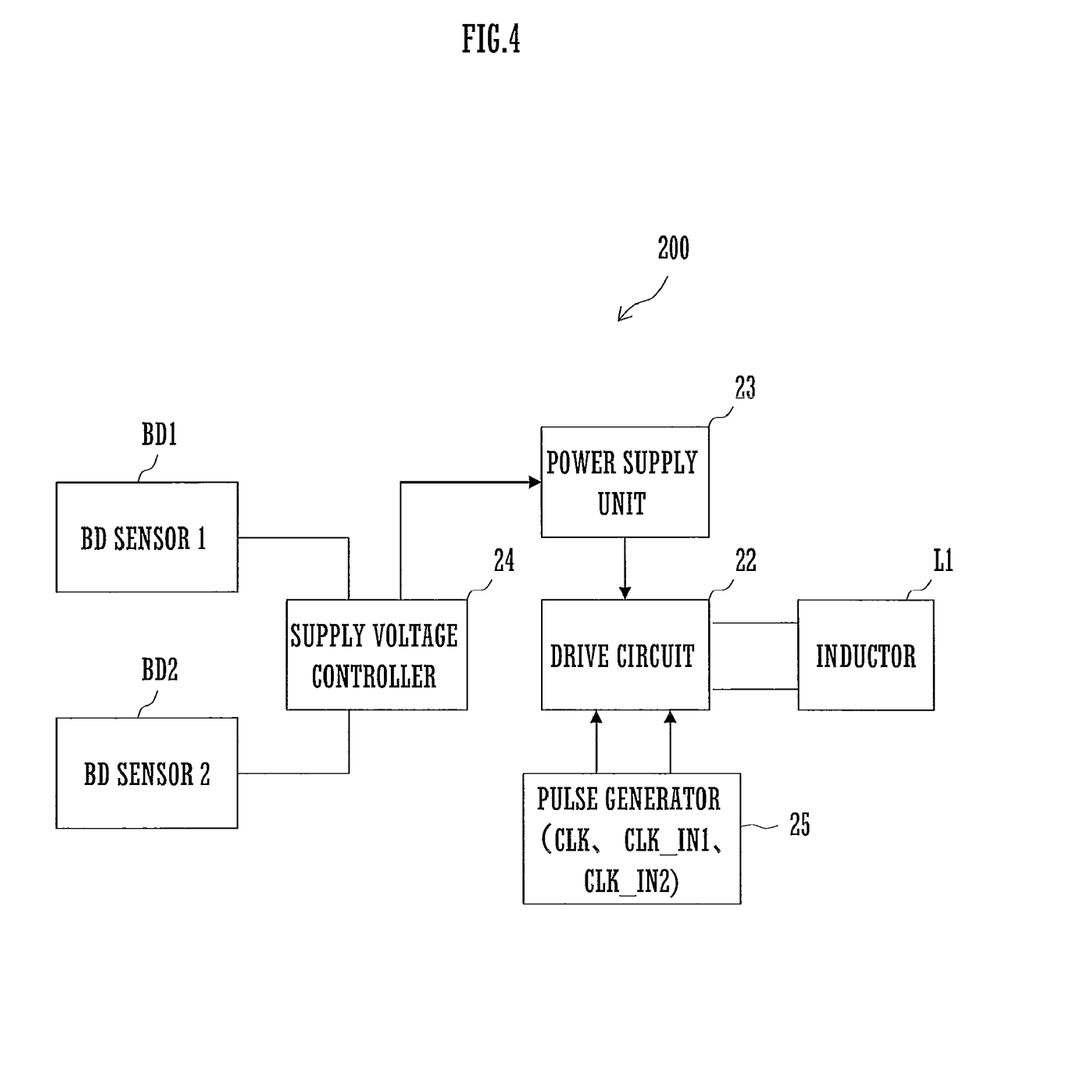
FIG. 4 is a block diagram of main components of the laser scanner of the image forming apparatus.

FIG. 4 is a block diagram of main components of the laser scanner 200, which further includes a drive circuit 22, a power supply unit 23, a supply voltage controller 24, and a pulse generator 25.

The drive circuit 22 makes the inductor L1 generate a magnetic field. The power supply unit 23 converts commercial power into drive power and supplies the drive power to components of the main body of the laser scanner 200. The supply voltage controller 24 controls the operation of components of the main body of the laser scanner 200. The pulse generator 25 generates clock signals CLK, CLK_IN1, and CLK_IN2.

The drive circuit 22, power supply unit 23, and supply voltage controller 24 correspond to the electric supply unit of the present invention. The supply voltage controller 24 corresponds to the measuring unit of the present invention. The photodiodes BD1 and BD2 correspond to the receiving elements of the present invention. The laser diode 1 corresponds to the emitter of the present invention.

Each of the photodiodes BD1 and BD2 is fitted at one end of the scanning range θ. When the photodiodes BD1 and BD2 detect the laser beam 10, they output detection signals.

The drive circuit 22 supplies current to the inductor L1 to generate a magnetic field. The power supply unit 23 supplies supply voltage to the drive circuit 22. The supply voltage controller 24 controls the supply voltage which the power supply unit 23 supplies to the drive circuit 22.

Figure 5:
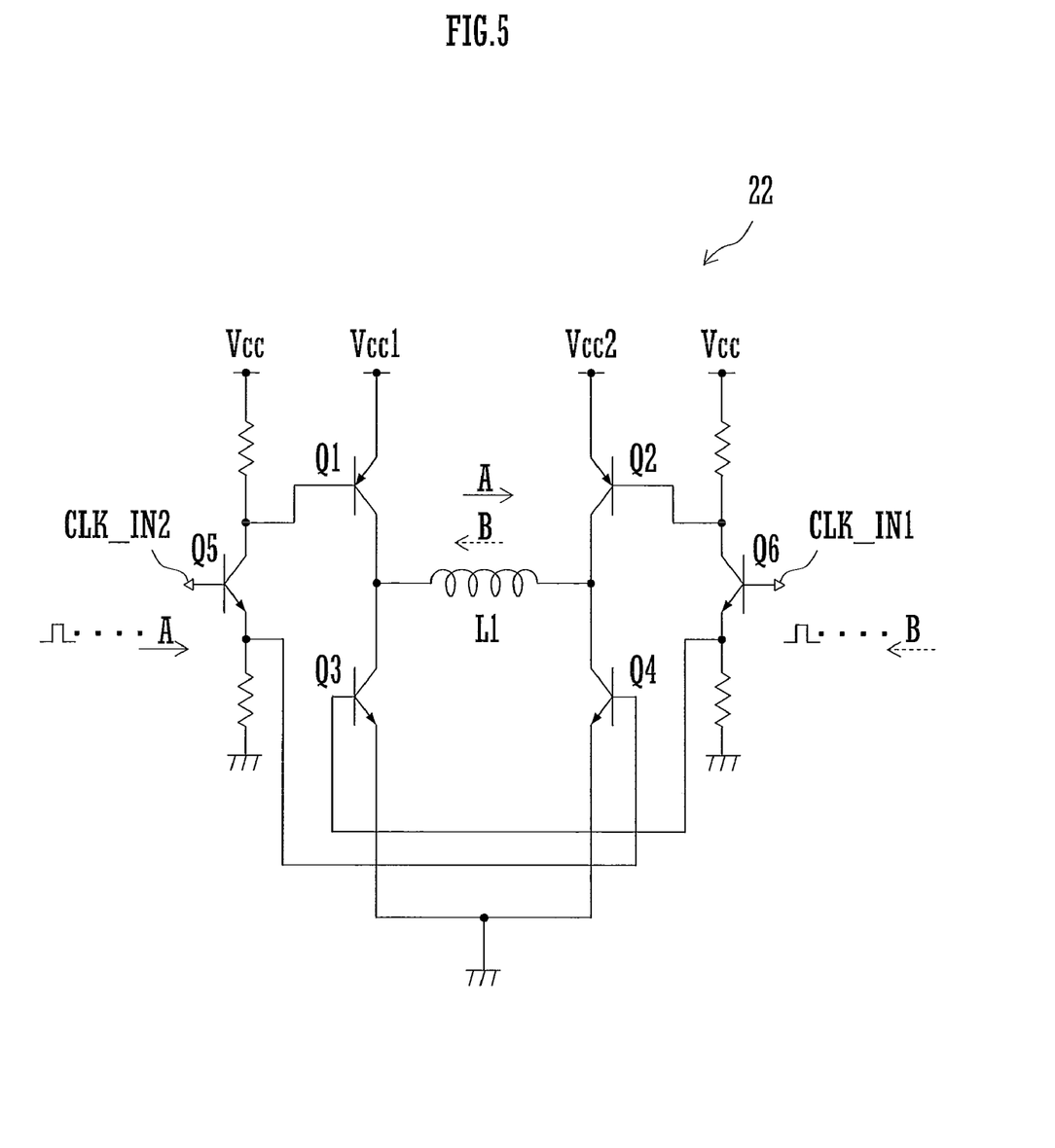
FIG. 5 is a circuit diagram of the drive circuit of the laser scanner.

FIG. 5 is a circuit diagram of the drive circuit 22. The drive circuit 22 reverses the current flow (A or B in FIG. 5) through the inductor L1 so as to reverse the polarities N and S of the magnetic field (FIGS. 2B and 2C). This turns the magnetically polarized galvanomirror 2 at the uniform angular velocity between its angular positions shown in FIGS. 2B and 2C. The direction in which the galvanomirror 2 turns depends on the polarities of the magnetic field generated by the inductor L1. As a result, with reference to FIG. 1, while the galvanomirror 2 is turning in the direction A or B, it scans the photosensitive drum 4 with the laser beam 10. The drive circuit 22 will be described in detail below.

The drive circuit 22 includes transistors Q1-Q6. The power supply unit 23 outputs supply voltages Vcc, Vcc1, and Vcc2 to the input terminals of the drive circuit 22. The pulse generator 25 outputs the clock signals CLK_IN1 and CLK_IN2 to the bases of the transistors Q6 and Q5 respectively.

When the transistor Q5 is switched on with the clock signal CLK_IN2 input into its base, the transistors Q1 and Q4 are switched on, so that a drive current flows through the inductor L1 in the direction A. When the transistor Q6 is switched on with the clock signal CLK_IN1 input into its base, the transistors Q2 and Q3 are switched on, so that a drive current flows through the inductor L1 in the direction B. Accordingly, with the clock signals CLK_IN1 and CLK_IN2 input alternately, the current flow through the inductor L1 is reversed, so that the polarities of the magnetic field are reversed.

Figure 6A:
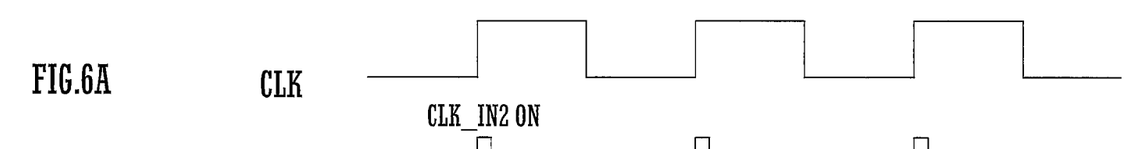
FIGS. 6A and 6B show the waveforms of the clock signals generated by the pulse generator of the laser scanner.
Figure 6B:
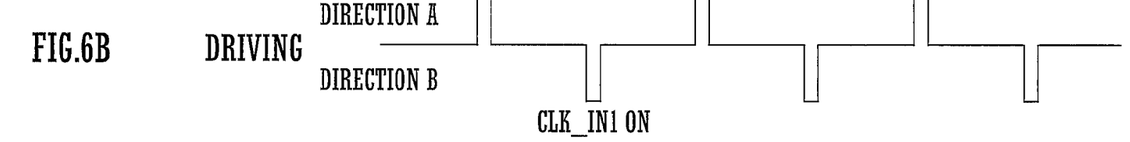
Figure 6C:
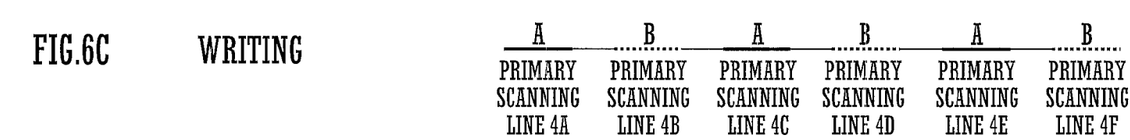
FIG. 6C shows the directions in which the galvanomirror scans the photosensitive drum of the image forming apparatus.
Figure 6D:
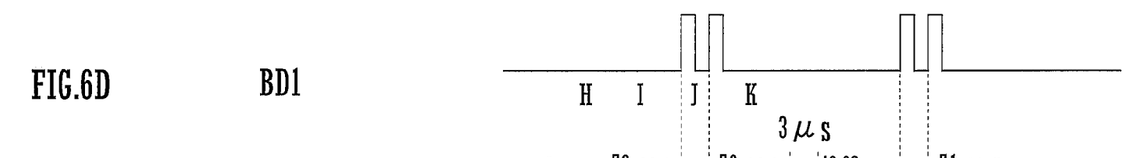
FIGS. 6D and 6E show the waveforms of the detection signals output by the photodiodes of the laser scanner.
Figure 6E:
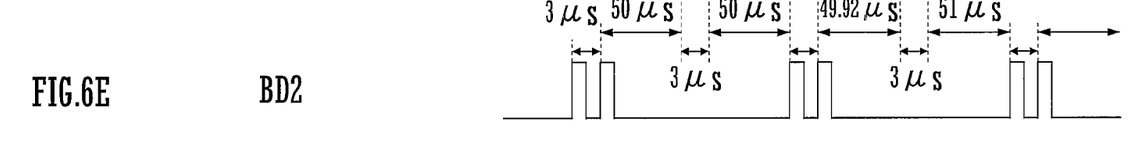
Figure 6F:
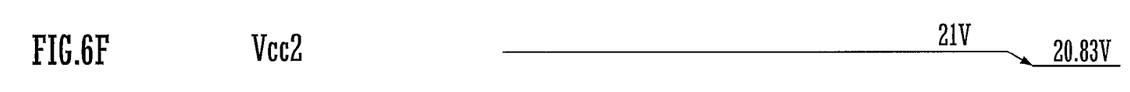
FIGS. 6F and 6G show the supply voltages input into the drive circuit of the laser scanner.
Figure 6G:
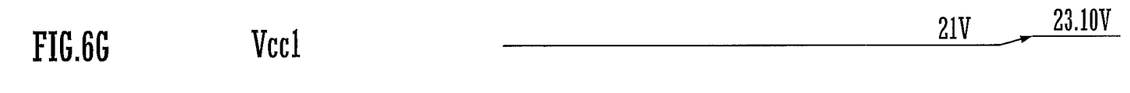

FIG. 6A shows the waveform of a clock signal CLK generated by the pulse generator 25. FIG. 6B shows the waveform of the other clock signals CLK_IN1 and CLK_IN2 generated by the generator 25. FIG. 6C shows the scanning directions A and B, in which the galvanomirror 2 scans the photosensitive drum 4 with the laser beam 10. FIG. 6D shows the waveform of the detection signal output by the photodiode BD1 when this diode detects the laser beam 10. FIG. 6E shows the waveform of the detection signal output by the photodiode BD2 when this diode detects the beam 10. FIGS. 6F and 6G show the supply voltages Vcc2 and Vcc1, respectively, input from the power supply unit 23 into the drive circuit 22.

The scanning speed of the galvanomirror 2 may be normal during the first cycle of the clock signal CLK and abnormal during the succeeding cycles of this signal. As shown in FIGS. 6D and 6E, the speed at which the galvanomirror 2 scans the photosensitive drum 4 along the primary scanning line 4C in the direction A may differ from the speeds at which the galvanomirror scans the drum along the primary scanning lines 4D and 4E in the directions B and A respectively. As also shown in FIGS. 6D and 6E, the speeds at which the galvanomirror 2 scans the drum 4 along the primary scanning lines 4B and 4D in the direction B may differ from each other.

Figure 8:
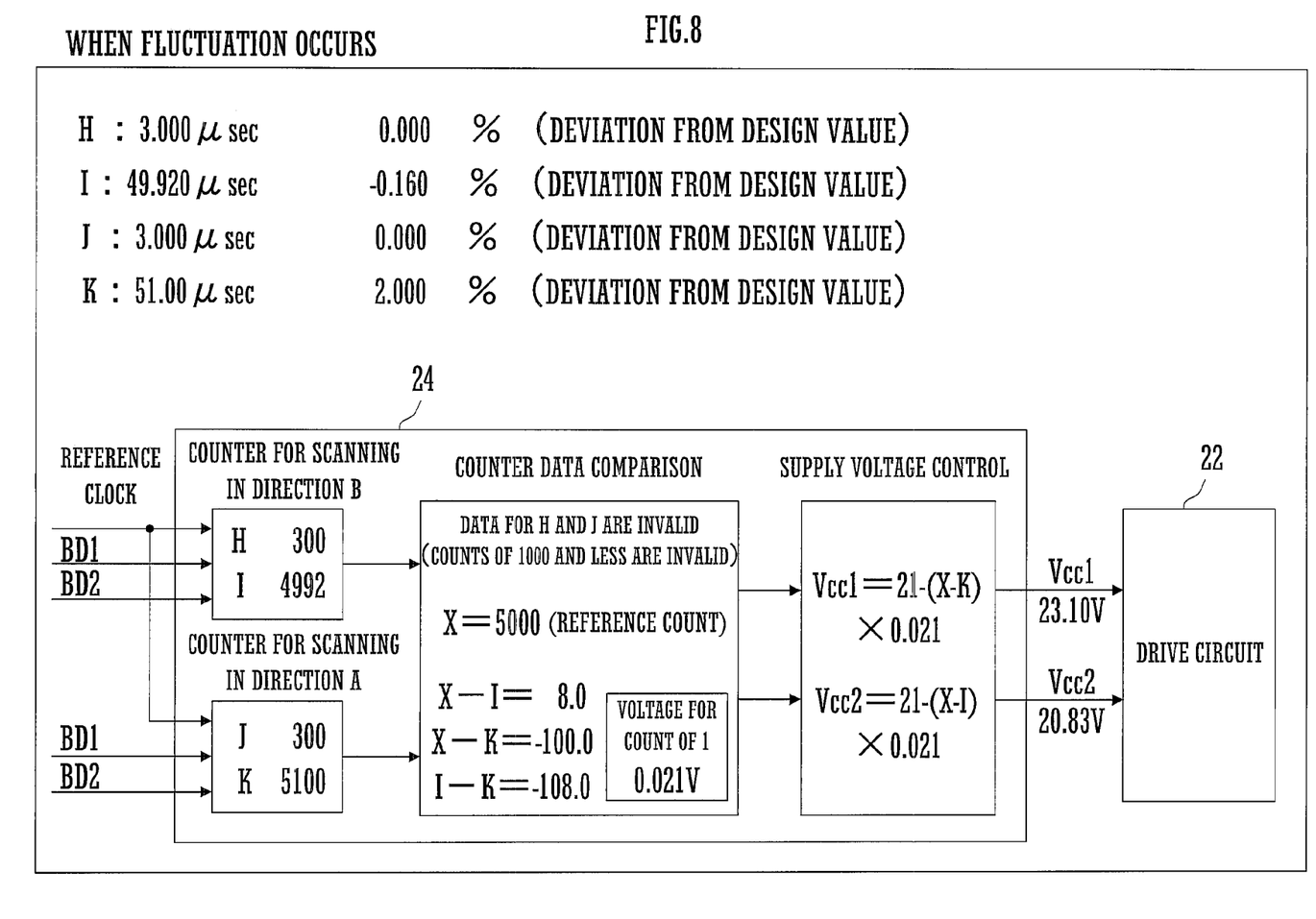
FIG. 8 is a timing chart of the voltage control based on the intervals at which the photodiodes detect the laser beam when the scanning speed is abnormal.

FIG. 7 is a timing chart of the voltage control based on the intervals at which the photodiodes BD1 and BD2 detect the laser beam 10 when the scanning speed of the galvanomirror 2 is normal. FIG. 8 is a timing chart of the voltage control based on the intervals at which the photodiodes BD1 and BD2 detect the beam 10 when the scanning speed is abnormal.

While the photosensitive drum 4 is scanned with the laser beam 10 in the direction A, it takes a time K for the beam to be detected by the photodiode BD2 after the beam is detected by the photodiode BD1. While the drum 4 is scanned with the beam 10 in the direction B, it takes a time I for the beam to be detected by the photodiode BD1 after the beam is detected by the photodiode BD2. The supply voltage controller 24 generates a reference clock CLK_IN3 for IK time comparison from the reference clock CLK and measures the scanning time K and scanning time I on the basis of the reference clock CLK_IN3.

More specifically, the supply voltage controller 24 counts the pulses of the reference clock CLK_IN3 for a turning time H (μs), the scanning time I (μs), a turning time J (μs), and the scanning time K (μs) and acquires counts, each of which is calculated by multiplying the time (μs) by 1,000 seconds. The controller 24 acquires the turning time H, scanning time I, turning time J, and scanning time K from the detection signals from the photodiodes BD1 and BD2.

The supply voltage controller 24 starts measuring the turning time H when the detection signal from the photodiode BD2 becomes high. The controller 24 stops measuring the turning time H when the detection signal from the photodiode BD2 becomes high again.

The supply voltage controller 24 starts measuring the scanning time I when the detection signal from the photodiode BD2 becomes high. The controller 24 stops measuring the scanning time I when the detection signal from the photodiode BD1 becomes high.

The supply voltage controller 24 starts measuring the turning time J when the detection signal from the photodiode BD1 becomes high. The controller 24 stops measuring the turning time J when the detection signal from the photodiode BD1 becomes high again.

The supply voltage controller 24 starts measuring the scanning time K when the detection signal from the photodiode BD1 becomes high. The controller 24 stops measuring the scanning time K when the detection signal from the photodiode BD2 becomes high.

The turning time H and turning time J are not used for the calculation of the supply voltages Vcc1 and Vcc2.

After the supply voltage controller 24 measures the scanning time K for one of the primary scanning lines for scanning in the direction A, the galvanomirror 2 scans the succeeding one of them, with the supply voltage Vcc1 changed according to the measured time K by the controller 24. After the controller 24 measures the scanning time I for one of the primary scanning lines for scanning in the direction B, the galvanomirror 2 scans the succeeding one of them, with the supply voltage Vcc2 changed according to the measured time I by the controller 24.

While the photosensitive drum 4 is scanned at the normal velocity, the scanning time K and scanning time I are equal to a reference time X, as shown in FIG. 7. In this case, the supply voltage controller 24 keeps the supply voltages Vcc1 and Vcc2 at 21 volts.

The scanning time K for the primary scanning line 4E for scanning in the direction A may be longer than the reference time X, as shown in FIG. 8. In this case, the galvanomirror 2 scans the succeeding primary scanning line 4G for scanning in the direction A, with the supply voltage Vcc1 increased by the supply voltage controller 24 (FIG. 6G).

The scanning time I for the primary scanning line 4D for scanning in the direction B may be shorter than the reference time X, as shown in FIG. 8. In this case, the galvanomirror 2 scans the succeeding primary scanning line 4F for scanning in the direction B, with the supply voltage Vcc2 decreased by the supply voltage controller 24 (FIG. 6F).

This normalizes the speeds at which the photosensitive drum 4 is scanned along the primary scanning lines 4F and 4G in the directions B and A respectively.

Thus, the supply voltage controller 24 so controls the supply voltages Vcc1 and Vcc2 that the galvanomirror 2 scans the photosensitive drum 4 along the primary scanning lines with the laser beam 10 at a substantially constant velocity. This enables the laser scanner 200 to form an electrostatic latent image of uniform quality on the drum 4. By developing this latent image, it is possible to form an image of uniform quality on a sheet of paper.

A description will be provided below of the voltage regulation timing for changing the voltages Vcc1 and Vcc2 applied to the inductor L1 for the galvanomirror 2 to scan the photosensitive drum 4.

Figure 9:
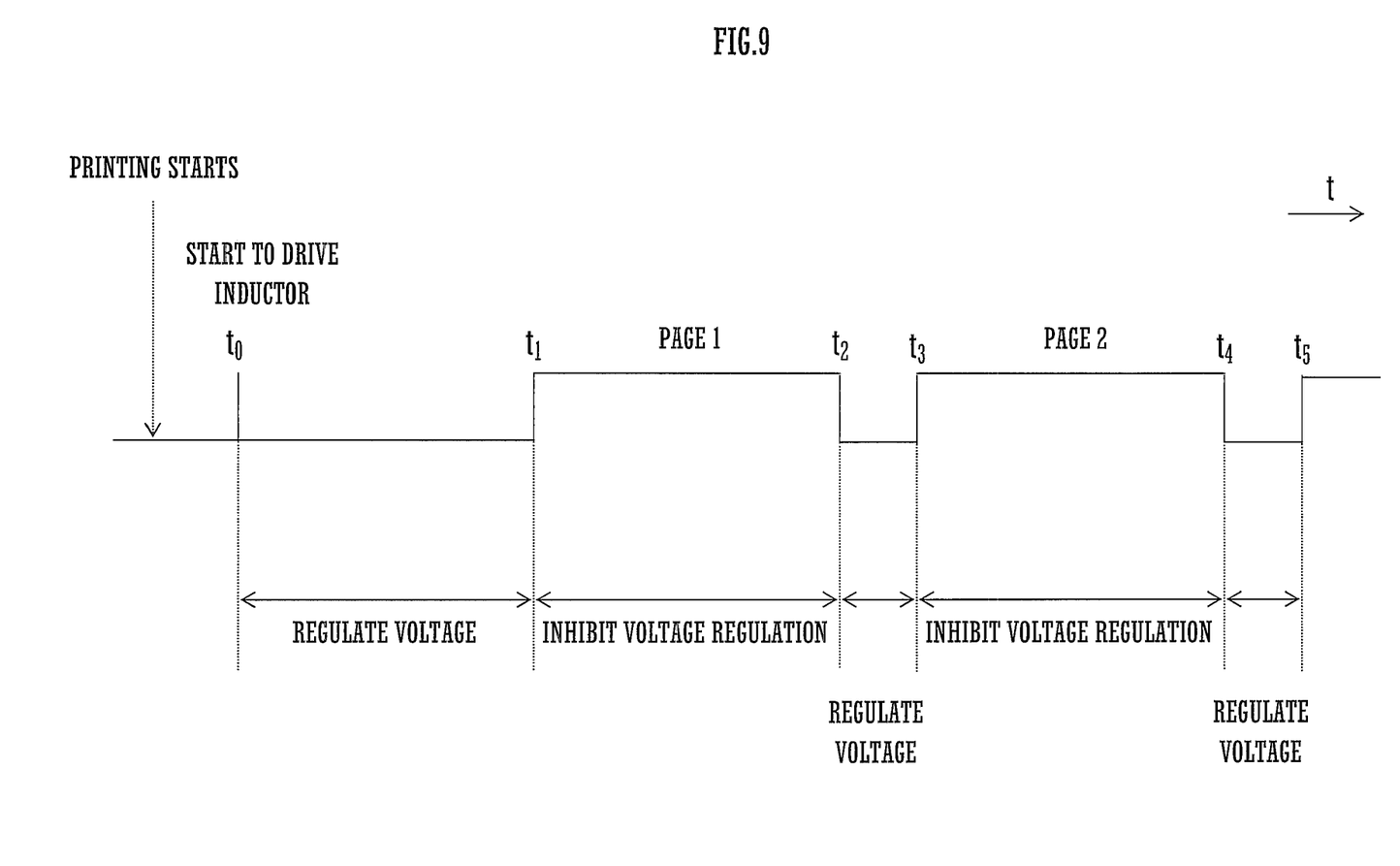
FIG. 9 is a timing chart of the regulation of the voltages applied to the inductor.

It is preferable that the voltages Vcc1 and Vcc2 applied to the inductor L1 be regulated as shown in FIG. 9, which is a timing chart of the voltage regulation. With reference to FIG. 9, the supply voltage controller 24 regulates the voltages Vcc1 and Vcc2 prior to the formation of an electrostatic latent image corresponding to the image to be formed on a sheet of paper (FIGS. 6A-6G and 8).

With reference to FIG. 9, an electrostatic latent image is formed on the photosensitive drum 4 between times t1 and t2, and between times t3 and t4. The supply voltage controller 24 regulates the voltages Vcc1 and Vcc2 between times t0 and t1, between times t2 and t3, and between times t4 and t5. The controller 24 inhibits the voltage regulation between times t1 and t2, and between times t3 and t4.

An electrostatic latent image corresponding to the image to be formed on the first page is formed on the photosensitive drum 4 between times t1 and t2, between which the voltages regulated between times t0 and t1 are applied to the inductor L1. Likewise, an electrostatic latent image corresponding to the image to be formed on the second page is formed on the drum 4 between times t3 and t4, between which the voltages regulated between times t2 and t3 are applied to the inductor L1.

This enables the laser scanner 200 to prevent the angular velocity of the galvanomirror 2 from varying due to noise superimposition on the output signals from the photodiodes BD1 and BD2 or another unexpected cause while an electrostatic latent image is formed on the photosensitive drum 4. As a result, the laser scanner 200 can form an electrostatic latent image of more uniform quality on the drum 4.

Figure 10:
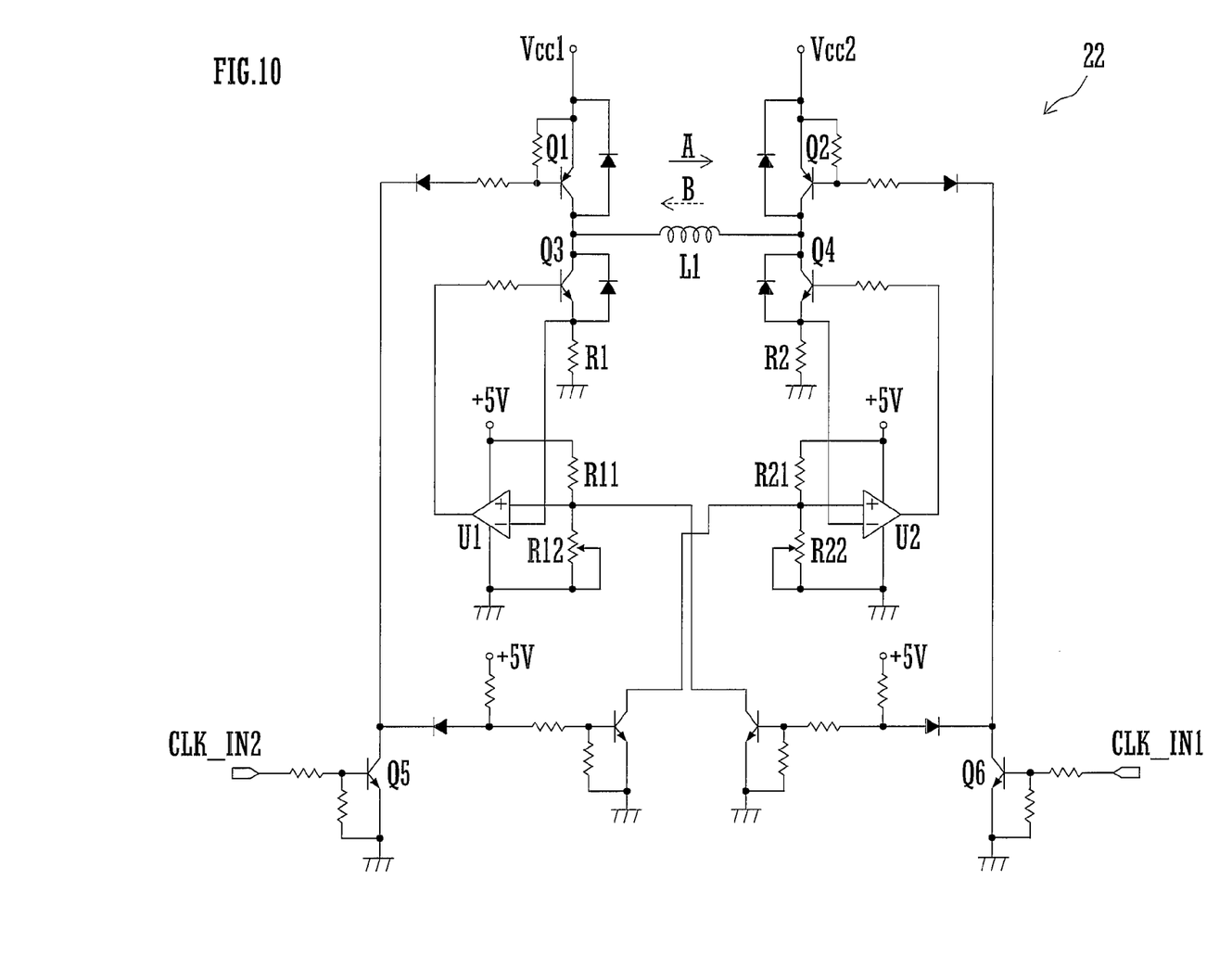
FIG. 10 is a circuit diagram of the drive circuit of the laser scanner of an image forming apparatus according to a modified embodiment of the present invention.

FIG. 10 is a circuit diagram of the drive circuit 22 of the laser scanner 200 of an image forming apparatus according to a modified embodiment of the present invention. This drive circuit 22 includes a constant-current circuit for making the current flow through the inductor L1 constant. Specifically, this circuit 22 includes transistors Q1-Q6, resistors R1, R2, R11, R12, R21 and R22, and comparators U1 and U2.

With reference to FIG. 10, when the transistor Q6 is switched on with a clock signal CLK_IN1 input into its base, the transistors Q2 and Q3 are switched on, so that a drive current flows through the inductor L1 in the direction B. The drive current then flows from the inductor L1 through the transistor Q3 and resistor R1. As a result, the voltage across the resistor R1 is input to the inverting input terminal of the comparator U1.

The resistors R11 and R12 divide a supply voltage of 5 volts. The voltage across the resistor R12 is input to the noninverting input terminal of the comparator U1. If the voltages input to both input terminals of the comparator U1 are equal, this comparator outputs a voltage to the base of the transistor Q3. As a result, the drive current flowing through the transistor Q3 is so controlled that the two input voltages are equal. Accordingly, the drive current flowing through the inductor L1 in the direction B is kept constant. Consequently, the laser scanner 200 of this embodiment prevents an overcurrent from flowing through the inductor L1.

With reference to FIG. 10, when the transistor Q5 is switched on with a clock signal CLK_IN2 input into its base, the transistors Q1 and Q4 are switched on, so that a drive current flows through the inductor L1 in the direction A. The drive current then flows from the inductor L1 through the transistor Q4 and resistor R2. As a result, the voltage applied to the resistor R2 by the drive current is input to the inverting input terminal of the comparator U2.

The resistors R21 and R22 divide the supply voltage of 5 volts. The voltage across the resistor R22 is input to the noninverting input terminal of the comparator U2. If the voltages input to both input terminals of the comparator U2 are equal, this comparator outputs a voltage to the base of the transistor Q4. As a result, the drive current flowing through the transistor Q4 is so controlled that the two input voltages are equal. Accordingly, the drive current flowing through the inductor L1 in the direction A is kept constant. Consequently, the laser scanner 200 of this embodiment prevents an overcurrent from flowing through the inductor L1.

What is claimed is:

1. An optical scanner for forming on a photosensitive body an electrostatic latent image corresponding to an image to be formed on a record medium, the scanner comprising:
    an inductor;
    an electric supply unit, electrically connected to the inductor, for applying a supply voltage to the inductor alternately in opposite applying directions so that the inductor generates a magnetic field based on the supply voltage;
    an emitter for emitting a laser beam;
    a mirror, provided in a vicinity of the inductor, for reflecting the laser beam to scan the photosensitive body in opposite scanning directions within a scanning range while the mirror is turned by the magnetic field;
    a first receiving element positioned at one end of the scanning range;
    a second receiving element positioned at the other end of the scanning range; and
    a measuring unit, connected to the first receiving element and the second receiving element, for measuring
    the scanning time taken for the laser beam to be detected by the second receiving element after the laser beam is detected by the first receiving element when the mirror scans the photosensitive body in one of the scanning directions and
    the scanning time taken for the laser beam to be detected by the first receiving element after the laser beam is detected by the second receiving element when the mirror scans the photosensitive body in the other scanning direction;
    wherein, when the mirror scans the photosensitive body along a first primary scanning line in a first direction after the mirror scans the photosensitive body along a second primary scanning line in a second direction opposite to the first direction, the electric supply unit varies the supply voltage according to the scanning time measured for the second primary scanning line, and
    wherein the electric supply unit regulates the supply voltage before the scanner forms the electrostatic latent image, and wherein the supply unit applies the regulated voltage to the inductor and inhibits the voltage regulation when the scanner forms the latent image.

2. An optical scanner for forming on a photosensitive body an electrostatic latent image corresponding to an image to be formed on a record medium, the scanner comprising:
   an inductor;
   an electric supply unit, electrically connected to the inductor, for applying a supply voltage to the inductor alternately in opposite directions so that the inductor generates a magnetic field based on the supply voltage;
   an emitter for emitting a laser beam;
   a mirror, provided in a vicinity of the inductor, for reflecting the laser beam to scan the photosensitive body in a first direction and a second direction within a scanning range while the mirror is turned by the magnetic field, the first and second directions being opposite to each other;
   a first receiving element positioned at one end of the scanning range;
   a second receiving element positioned at the other end of the scanning range; and
   a measuring unit, connected to the first receiving element and the second receiving element, for measuring
   the scanning time taken for the laser beam to be detected by the second receiving element after the laser beam is detected by the first receiving element when the mirror scans the photosensitive body in the first direction and
   the scanning time taken for the laser beam to be detected by the first receiving element after the laser beam is detected by the second receiving element when the mirror scans the photosensitive body in the second direction;
   wherein, when the mirror scans the photosensitive body along a first primary scanning line in the first direction after the mirror scans the photosensitive body along a second primary scanning line in the first direction, the electric supply unit varies the supply voltage according to the scanning time measured for the second primary scanning line;
   wherein, when the mirror scans the photosensitive body along a third primary scanning line in the second direction after the mirror scans the photosensitive body along a fourth primary scanning line in the second direction, the electric supply unit varies the supply voltage according to the scanning time measured for the fourth primary scanning line, and
   wherein the electric supply unit regulates the supply voltage before the scanner forms the electrostatic latent image, and wherein the supply unit applies the regulated voltage to the inductor and inhibits the voltage regulation when the scanner forms the latent image.

3. An optical scanner as claimed in claim 1, further comprising:
   a constant-current circuit for keeping constant the current flowing through the inductor.

4. An image forming apparatus comprising:
   an optical scanner as claimed in claim 1;
   the photosensitive body; and
   a developing unit for developing the electrostatic latent image formed on the photosensitive body by the optical scanner.

* * * * *